United States Patent
Glugla et al.

(10) Patent No.: US 10,196,999 B2
(45) Date of Patent: Feb. 5, 2019

(54) METHOD AND SYSTEM FOR PRE-IGNITION CONTROL

(71) Applicant: Ford Global Technologies, LLC, Dearborn, MI (US)

(72) Inventors: Chris Paul Glugla, Macomb, MI (US); Robert Sarow Baskins, Grass Lake, MI (US); James Matthew Kindree, South Lyon, MI (US); Chris Richard Weber, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 462 days.

(21) Appl. No.: 14/514,142

(22) Filed: Oct. 14, 2014

(65) Prior Publication Data

US 2015/0159573 A1 Jun. 11, 2015

Related U.S. Application Data

(60) Provisional application No. 61/912,370, filed on Dec. 5, 2013.

(51) Int. Cl.
*F02D 41/14* (2006.01)
*F02P 5/04* (2006.01)
(Continued)

(52) U.S. Cl.
CPC ....... *F02D 41/1498* (2013.01); *F02D 35/027* (2013.01); *F02D 37/02* (2013.01); *F02D 41/0002* (2013.01); *F02D 41/008* (2013.01); *F02D 41/1401* (2013.01); *F02D 41/1497* (2013.01); *F02D 41/402* (2013.01); *F02P 5/045* (2013.01); *F02P 5/152* (2013.01);
(Continued)

(58) Field of Classification Search
None
See application file for complete search history.

(56) References Cited

U.S. PATENT DOCUMENTS

| 5,215,059 A | 6/1993 | Kaneyasu |
| 5,433,179 A | 7/1995 | Wittry |

(Continued)

FOREIGN PATENT DOCUMENTS

| CN | 103334846 A | 10/2013 |
| EP | 1715179 A2 | 10/2006 |

OTHER PUBLICATIONS

Glugla, Chris P., "Method and System for Pre-Ignition Control," U.S. Appl. No. 14/604,279, filed Jan. 23, 2015, 54 pages.
(Continued)

*Primary Examiner* — Hung Q Nguyen
*Assistant Examiner* — Brian P Monahon
(74) *Attorney, Agent, or Firm* — Julia Voutyras; McCoy Russell LLP

(57) ABSTRACT

Methods and systems are provided for mitigating knock and/or pre-ignition. Each of a spark timing retard, cylinder enrichment, and engine load limiting is adjusted based on a knock sensor output generated in a single defined crank angle window, and not based on knock sensor output generated outside the defined crank angle window. A severity of the mitigating actions is adjusted in proportion to the knock sensor output intensity with the severity of the mitigating action increased as the knock sensor output intensity increases.

20 Claims, 9 Drawing Sheets

(51) Int. Cl.
*F02D 41/00* (2006.01)
*G01L 23/22* (2006.01)
*F02P 5/152* (2006.01)
*F02D 35/02* (2006.01)
*F02D 37/02* (2006.01)
*F02D 41/38* (2006.01)
*F02D 41/40* (2006.01)

(52) U.S. Cl.
CPC .... *G01L 23/221* (2013.01); *F02D 2041/1418* (2013.01); *F02D 2041/389* (2013.01); *F02D 2200/101* (2013.01); *Y02T 10/42* (2013.01); *Y02T 10/44* (2013.01); *Y02T 10/46* (2013.01)

(56) References Cited

U.S. PATENT DOCUMENTS

| | | | |
|---|---|---|---|
| 5,632,247 A | 5/1997 | Hashizume et al. | |
| 6,125,801 A | 10/2000 | Mendler | |
| 7,640,911 B2 | 1/2010 | Pien | |
| 8,073,613 B2 | 12/2011 | Rollinger et al. | |
| 8,260,530 B2 | 9/2012 | Rollinger et al. | |
| 8,463,533 B2* | 6/2013 | Glugla | F02D 35/027 123/406.3 |
| 8,731,799 B2 | 5/2014 | Makino et al. | |
| 8,919,097 B2* | 12/2014 | Kerns | F02D 41/0087 123/198 F |
| 2007/0119415 A1* | 5/2007 | Lewis | F01N 11/007 123/295 |
| 2008/0276688 A1* | 11/2008 | Kearney | G01L 23/225 73/35.04 |
| 2009/0320790 A1* | 12/2009 | Lewis | F01N 11/002 123/299 |
| 2010/0063712 A1* | 3/2010 | Bromberg | F02D 19/12 701/111 |
| 2011/0139118 A1* | 6/2011 | Glugla | F02D 35/027 123/406.29 |
| 2011/0139120 A1* | 6/2011 | Rollinger | F01L 1/34 123/436 |
| 2011/0144893 A1* | 6/2011 | Rollinger | F02D 35/027 701/111 |
| 2011/0202260 A1* | 8/2011 | Cunningham | F02D 35/02 701/104 |
| 2011/0224882 A1* | 9/2011 | Makino | F02D 35/021 701/102 |
| 2011/0239986 A1* | 10/2011 | Shishime | F02D 13/0238 123/406.29 |
| 2011/0265762 A1* | 11/2011 | Lorenz | F02D 35/027 123/406.45 |
| 2012/0029795 A1* | 2/2012 | Surnilla | F02D 35/027 701/111 |
| 2012/0166065 A1* | 6/2012 | Lewis | F02D 41/0025 701/103 |
| 2012/0245827 A1* | 9/2012 | Glugla | F02D 41/3094 701/105 |
| 2013/0035841 A1* | 2/2013 | Glugla | F02D 41/22 701/105 |
| 2014/0000557 A1* | 1/2014 | Glugla | F02D 41/008 123/435 |
| 2014/0116395 A1 | 5/2014 | Blackstock | |
| 2014/0214306 A1* | 7/2014 | Badillo | F02D 19/08 701/104 |

OTHER PUBLICATIONS

State Intellectual Property Office of the People's Republic of China, Office Action and Search Report Issued in Application No. 201410733952.4, dated Jul. 2, 2018, 13 pages. (Submitted with Partial Translation).

* cited by examiner

FIG. 8

802 — Enrichment cycles

| KI | 0 | 15 | 30 | 150 | 300 | 500 |
|---|---|---|---|---|---|---|
|  | 0 | 1 | 2 | 3 | 4 | 6 |

804 — Enrichment cycles

| Ne | 1000 | 2000 | 2500 | 3000 | 4000 | 4500 |
|---|---|---|---|---|---|---|
|  | 0 | 1 | 2 | 3 | 4 | 6 |

806 — Load limiting

| KI ↓ / Ne → | 1000 | 2000 | 2500 | 3000 | 4000 | 4500 |
|---|---|---|---|---|---|---|
| 375 | 1.2 | 1.2 | 1.5 | 1.0 | 1.0 | 1.0 |
| 250 | 1.1 | 1.1 | 1.2 | 1.0 | 1.0 | 1.0 |
| 125 | 1 | 1 | 1.2 | 1.0 | 1.0 | 1.0 |
| 20 | 0.9 | 1 | 1.1 | 1.0 | 1.0 | 1.0 |

808 — Enrichment cycles

| KI ↓ / Ne → | 1000 | 2000 | 2500 | 3000 | 4000 | 4500 |
|---|---|---|---|---|---|---|
| 500 | 12 | 14 | 14 | 18 | 24 | 30 |
| 300 | 12 | 12 | 14 | 14 | 18 | 24 |
| 150 | 10 | 12 | 12 | 14 | 14 | 18 |
| 30 | 10 | 12 | 12 | 12 | 14 | 14 |
| 15 | 10 | 10 | 10 | 10 | 12 | 14 |
| 0 | 0 | 0 | 0 | 0 | 0 | 0 |

810 — Rate Incrementer

| KI ↓ / Ne → | 1000 | 2000 | 2500 | 3000 | 4000 | 4500 |
|---|---|---|---|---|---|---|
| 500 | 0.1 | 0.2 | 0.3 | 0.6 | 0.2 | 0.1 |
| 300 | 0.1 | 0.1 | 0.2 | 0.4 | 0.1 | 0.1 |
| 150 | 0.1 | 0.1 | 0.1 | 0.2 | 0.1 | 0 |
| 30 | 0.1 | 0 | 0.1 | 0.1 | 0 | 0 |
| 15 | 0 | 0 | 0 | 0 | 0 | 0 |
| 0 | 0 | 0 | 0 | 0 | 0 | 0 |

METHOD AND SYSTEM FOR PRE-IGNITION CONTROL

CROSS REFERENCE TO RELATED APPLICATIONS

The present application claims priority to U.S. Provisional Patent Application No. 61/912,370, entitled "METHOD AND SYSTEM FOR PRE-IGNITION CONTROL," filed Dec. 5, 2013, the entire contents of which are hereby incorporated by reference for all purposes.

FIELD

The present description relates generally to methods and systems for controlling a vehicle engine in response to abnormal combustion.

BACKGROUND/SUMMARY

Under certain operating conditions, engines that have high compression ratios, or are boosted to increase specific output, may be prone to low speed abnormal combustion events, such as due to pre-ignition. The early abnormal combustion due to pre-ignition can cause very high in-cylinder pressures, and can result in combustion pressure waves similar to combustion knock, but with larger intensity. Such abnormal combustion events can cause rapid engine degradation. Accordingly, strategies have been developed for early detection and mitigation of abnormal combustion events based on engine operating conditions.

One example approach is illustrated by Hashizume in U.S. Pat. No. 5,632,247. Therein, abnormal cylinder combustion due to pre-ignition and/or knock is detected by a knock sensor attached to the cylinder block. Specifically, based on an estimation of the knock sensor reading in two different timing windows, each with differing thresholds, pre-ignition events are determined and differentiated from knock.

However, the inventors herein have identified potential issues with such an approach. In one example, the approach requires substantial signal processing to differentiate abnormal combustion due to pre-ignition from abnormal combustion due to knock before an appropriate mitigating action can be performed. As such, this may add complexity to the detection and differentiation of combustion events. As another example, the approach uses distinct, non-overlapping windows. However, there may be regions in the knock window where pre-ignition may be better identified and vice versa. The sensitivity of the approach may also vary depending on the positioning of the sensor. Overall, system complexity and cost is increased without necessarily improving the performance of either knock or pre-ignition detection in the cylinder. As such, the reduced accuracy of engine pre-ignition determination and differentiation (from knock) may lead to rapid engine degradation. Additionally, distinguishing between knock and pre-ignition can be inaccurate and lead to incorrect actions being taken for each type of event, leading to degraded performance.

In one example, some of the above issues may be addressed by a method for detecting and addressing abnormal combustion. The method comprises: in response to a knock sensor output intensity occurring within a first window for a given cylinder combustion event, enriching the cylinder as a function of the output intensity. The method further comprises, in response to the knock sensor output intensity occurring within a second window for the combustion event being higher than a threshold, retarding spark ignition timing, the first window partially overlapping the second window. In this way, abnormal combustion due to knock and/or pre-ignition may be better addressed.

As an example, an engine system may include one or more knock sensors arranged in, at, or along an engine block or coupled to engine cylinders. Knock sensor output generated in one or more of a first and second crank angle timing window may be used to address abnormal combustion, such as those due to knock and/or pre-ignition. The first and second windows may be partially overlapping with the first window starting before the second window starts, the first window ending before the second window ends. The windows may be defined by specified crank angles as a function of engine operating conditions, such as engine speed and load. For a given cylinder combustion event, the first crank angle timing window may start before a cylinder spark ignition event (such as at 15 degrees ATC) and end in an expansion stroke of the cylinder (such as at 40 degrees ATC), while the second crank angle timing window may start after the cylinder spark ignition event and end in the expansion stroke, after the first window ends. Sensor output generated in the first and second windows may be processed (e.g., band pass filtered, rectified, and integrated) to determine respective output intensities. Based on the output intensity in the first window, a first set of abnormal combustion mitigating actions (e.g., pre-ignition mitigating actions) may be determined. For example, the cylinder may be enriched, with an amount of enrichment to be applied (degree of richness, number of enriched engine cycles, number of engine cylinders to be enriched, etc.) determined as a function of the output intensity. A look-up table stored in the controller's memory as a function of engine speed and knocking intensity may be used to determine the enrichment. In addition, as the number of enrichment cycles exceeds a threshold, an amount of engine load limiting may be applied. Further, spark timing may be adjusted (e.g., advanced) based on the enrichment applied to recover torque lost from operating richer than RBT. Based on the output intensity in the second window being higher than a threshold, a different set of abnormal combustion mitigating actions (e.g., knock mitigating actions) may be determined. For example, spark ignition timing may be retarded, an amount of spark retard applied increased as the output intensity exceeds the threshold in the second window. Thus, as the output intensity of the knock sensor increases in the first and/or second windows, a proportionally higher and more severe mitigating action may be performed.

The inventors herein have further recognized the synergistic relationship between abnormal combustion mitigating actions, such as those that address knock and those that address pre-ignition. Specifically, as a cylinder enrichment is increased (in proportion to increased knocking intensity), the resulting cylinder charge cooling reduces the likelihood of further abnormal combustion events in the cylinder (such as those due to knock) while also increasing tolerance of spark timing advance. As a result, as the cylinder enrichment determined based on the output in the first window increases (e.g., exceeds a threshold level), the amount of spark retard applied in response to the output in the second window may be decreased.

In this way, abnormal cylinder combustion may be addressed while reducing the complexity of knock sensor output processing. For example, abnormal combustion due to abnormal combustion events such as one or more of knock and pre-ignition may be mitigated without necessitating differentiation of the signals. In addition, the need for multiple knock sensors, multiple knock sensing windows, or multiple thresholds is reduced. By adjusting a severity of mitigating actions applied in response to an abnormal combustion event based on the output intensity of a knock sensor in defined windows, abnormal combustion due to each of knock and pre-ignition can be addressed without requiring knock and pre-ignition differentiation. By using partially overlapping windows, the accuracy of abnormal combustion detection can be improved. By increasing an enrichment and load limiting applied to an engine as the knock sensor output intensity in a first, earlier window increases, abnormal combustion induced further mega-knock events can be preempted. By adjusting an amount of spark timing retard applied based on the knock sensor intensity in a second, later window, partially overlapping the first window, knocking can be addressed. By using the same knock sensor to address different kinds of abnormal cylinder combustion events, component reduction benefits may be achieved.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 8 shows example look-up tables that may be used by an engine controller to determine spark timing retard, cylinder enrichment, and load limiting, accordingly to the present disclosure.

DETAILED DESCRIPTION

Figure 1:
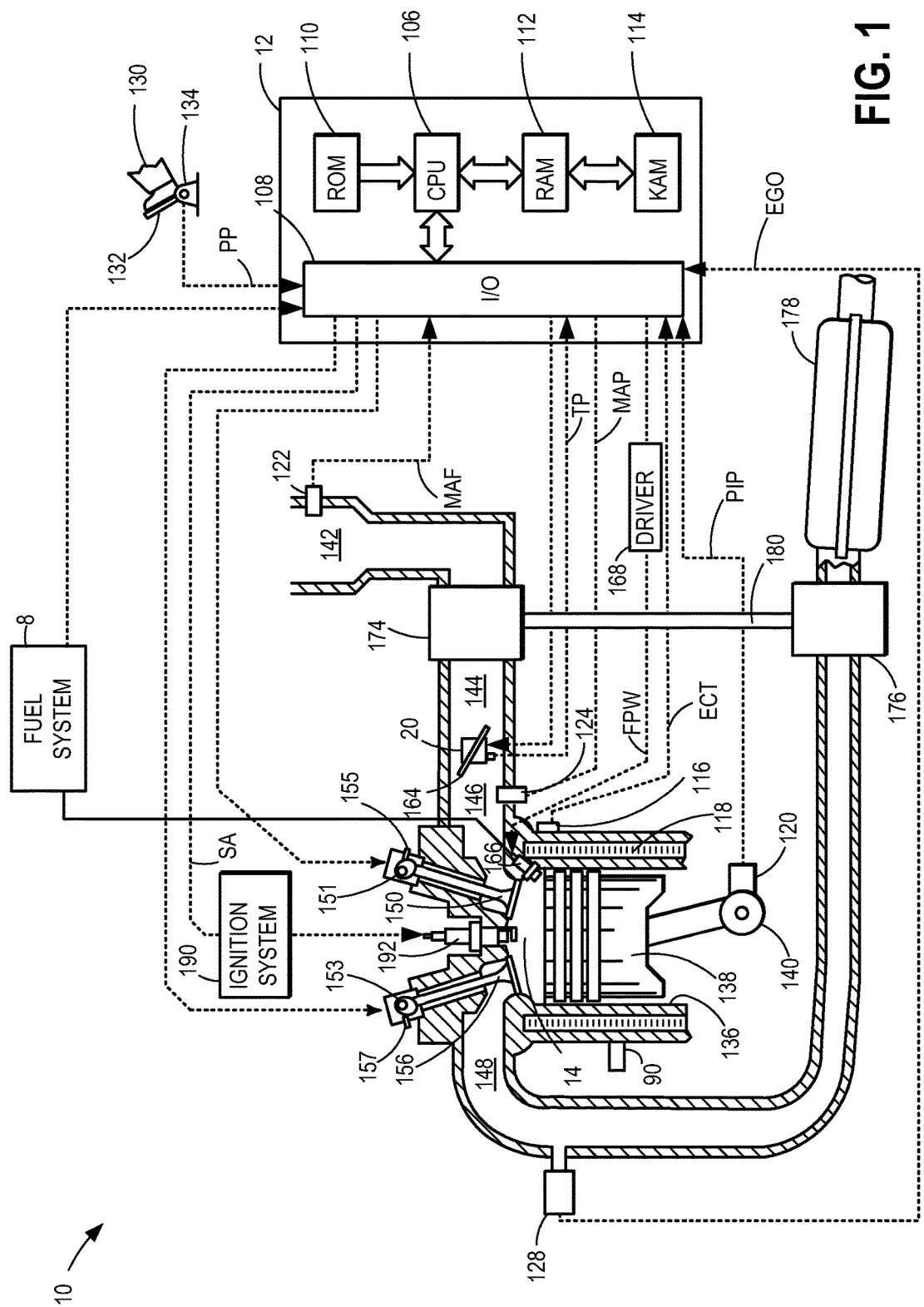
FIG. 1 shows a partial engine view.

The following description relates to systems and methods for mitigating abnormal combustion induced mega-knock events in an engine, such as in the engine system of FIG. 1. An engine controller may be configured to perform a control routine, such as the routine of FIGS. 2-4, to perform one or more mitigating adjustments based on the output intensity of knock sensor signals generated in two partially overlapping crank angle timing windows. The controller may not perform any adjustment based on knock sensor signals generated outside the defined windows. The controller may adjust an amount of cylinder enrichment applied based on the output intensity of a knock sensor signal generated in a first, earlier of the two windows. As further elaborated with reference to FIGS. 5-7, the controller may further determine an amount of engine load limiting to be applied, as well as spark timing adjustments to be applied, based on the determined enrichment. The engine controller may additionally adjust an amount of spark retard or advance applied based on the output intensity of a knock sensor signal generated in a second, later of the two windows. The controller may use one or more look-up tables, such as the look-up tables of FIG. 8, to determine a severity of mitigating action to apply while also updating a rate incrementer indicative of abnormal combustion frequency. Example mitigating operations are described at FIG. 9.

FIG. 1 depicts an example embodiment of a combustion chamber or cylinder of internal combustion engine 10. Engine 10 may receive control parameters from a control system including controller 12 and input from a vehicle operator 130 via an input device 132. In this example, input device 132 includes an accelerator pedal and a pedal position sensor 134 for generating a proportional pedal position signal PP. Cylinder (herein also "combustion chamber') 14 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor may be coupled to crankshaft 140 via a flywheel to enable a starting operation of engine 10.

Cylinder 14 can receive intake air via a series of intake air passages 142, 144, and 146. Intake air passage 146 can communicate with other cylinders of engine 10 in addition to cylinder 14. In some embodiments, one or more of the intake passages may include a boosting device such as a turbocharger or a supercharger. For example, FIG. 1 shows engine 10 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor or the engine. A throttle 20 including a throttle plate 164 may be provided along an intake passage of the engine for varying the flow rate and/or pressure of intake air provided to the engine cylinders. For example, throttle 20 may be disposed downstream of compressor 174 as shown in FIG. 1, or alternatively may be provided upstream of compressor 174.

Exhaust passage 148 can receive exhaust gases from other cylinders of engine 10 in addition to cylinder 14. Exhaust gas sensor 128 is shown coupled to exhaust passage 148 upstream of emission control device 178. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 178 may be a three way catalyst (TWC), NOx trap, various other emission control devices, or combinations thereof.

Exhaust temperature may be estimated by one or more temperature sensors (not shown) located in exhaust passage 148. Alternatively, exhaust temperature may be inferred based on engine operating conditions such as speed, load, air-fuel ratio (AFR), spark retard, etc. Further, exhaust temperature may be computed by one or more exhaust gas sensors 128. It may be appreciated that the exhaust gas temperature may alternatively be estimated by any combination of temperature estimation methods listed herein.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some embodiments, each cylinder of engine 10, including cylinder 14, may include at least two intake poppet valves and at least two exhaust poppet valves located at an upper region of the cylinder.

Intake valve 150 may be controlled by controller 12 by cam actuation via cam actuation system 151. Similarly, exhaust valve 156 may be controlled by controller 12 via cam actuation system 153. Cam actuation systems 151 and 153 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 150 and exhaust valve 156 may be determined by valve position sensors 155 and 157, respectively. In alternative embodiments, the intake and/or exhaust valve may be controlled by electric valve actuation. For example, cylinder 14 may alternatively include an intake valve controlled via electric valve actuation and an exhaust valve controlled via cam actuation including CPS and/or VCT systems. In still other embodiments, the intake and exhaust valves may be controlled by a common valve actuator or actuation system, or a variable valve timing actuator or actuation system.

Cylinder 14 can have a compression ratio, which is the ratio of volumes when piston 138 is at bottom center to top center. Conventionally, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some embodiments, each cylinder of engine 10 may include a spark plug 192 for initiating combustion. Ignition system 190 can provide an ignition spark to combustion chamber 14 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

In some embodiments, each cylinder of engine 10 may be configured with one or more fuel injectors for providing fuel thereto. As a non-limiting example, cylinder 14 is shown including one fuel injector 166. Fuel injector 166 is shown coupled directly to cylinder 14 for injecting fuel directly therein in proportion to the pulse width of signal FPW received from controller 12 via electronic driver 168. In this manner, fuel injector 166 provides what is known as direct injection (hereafter also referred to as "DI") of fuel into combustion cylinder 14. While FIG. 1 shows injector 166 as a side injector, it may also be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing. Fuel may be delivered to fuel injector 166 from a high pressure fuel system 8 including fuel tanks, fuel pumps, and a fuel rail. Alternatively, fuel may be delivered by a single stage fuel pump at lower pressure, in which case the timing of the direct fuel injection may be more limited during the compression stroke than if a high pressure fuel system is used. Further, while not shown, the fuel tanks may have a pressure transducer providing a signal to controller 12. It will be appreciated that, in an alternate embodiment, injector 166 may be a port injector providing fuel into the intake port upstream of cylinder 14.

It will also be appreciated that while the depicted embodiment illustrates the engine being operated by injecting fuel via a single direct injector; in alternate embodiments, the engine may be operated by using two injectors (for example, a direct injector and a port injector) and varying a relative amount of injection from each injector.

Fuel may be delivered by the injector to the cylinder during a single cycle of the cylinder. Further, the distribution and/or relative amount of fuel delivered from the injector may vary with operating conditions. Furthermore, for a single combustion event, multiple injections of the delivered fuel may be performed per cycle. The multiple injections may be performed during the compression stroke, intake stroke, or any appropriate combination thereof. Also, fuel may be injected during the cycle to adjust the air-to-injected fuel ratio (AFR) of the combustion. For example, fuel may be injected to provide a stoichiometric AFR. An AFR sensor may be included to provide an estimate of the in-cylinder AFR. In one example, the AFR sensor may be an exhaust gas sensor, such as EGO sensor 128. By measuring an amount of residual oxygen (for lean mixtures) or unburned hydrocarbons (for rich mixtures) in the exhaust gas, the sensor may determine the AFR. As such, the AFR may be provided as a Lambda ($\lambda$) value, that is, as a ratio of actual AFR to stoichiometry for a given mixture. Thus, a Lambda of 1.0 indicates a stoichiometric mixture, richer than stoichiometry mixtures may have a lambda value less than 1.0, and leaner than stoichiometry mixtures may have a lambda value greater than 1.

As described above, FIG. 1 shows only one cylinder of a multi-cylinder engine. As such each cylinder may similarly include its own set of intake/exhaust valves, fuel injector(s), spark plug, etc.

Fuel tanks in fuel system 8 may hold fuel with different fuel qualities, such as different fuel compositions. These differences may include different alcohol content, different octane, different heat of vaporizations, different fuel blends, and/or combinations thereof etc.

Engine 10 may further include a knock sensor 90 coupled to each cylinder 14 for identifying abnormal cylinder combustion events. In alternate embodiments, one or more knock sensors 90 may be coupled to selected locations of the engine block. The knock sensor may be an accelerometer on the cylinder block, or an ionization sensor configured in the spark plug of each cylinder. The output of the knock sensor may be combined with the output of a crankshaft acceleration sensor to indicate an abnormal combustion event in the cylinder. In one example, based on the output of knock sensor 90 in a one or more defined windows (e.g., crank angle timing windows), abnormal combustion due to one or more of knock and pre-ignition may be addressed. In particular, the severity of a mitigating action applied may be adjusted to address an occurrence of knock and pre-ignition, as well as to reduce the likelihood of further knock or pre-ignition events.

Based on the knock sensor signal, such as a signal timing, amplitude, intensity, frequency, etc., and further based on the crankshaft acceleration signal, the controller may address abnormal cylinder combustion events. For example, the controller may identify and differentiate abnormal combustion due to knock and/or pre-ignition. As an example, pre-ignition may be indicated in response to knock sensor signals that are generated in an earlier window (e.g., before a cylinder spark event) while knock may be indicated in response to knock sensor signals that are generated in a later window (e.g., after the cylinder spark event). Further, pre-ignition may be indicated in response to knock sensor output signals that are larger (e.g., higher than a first threshold), and/or less frequent while knock may be indicated in response to knock sensor output signals that are smaller (e.g., higher than a second threshold, the second threshold lower than the first threshold) and/or more frequent. Additionally, pre-ignition may be distinguished from knock based on the engine operating conditions at the time of abnormal combustion detection. For example, high knock intensities at low engine speed may be indicative of low speed pre-ignition. In other embodiments, abnormal combustion due to knock and pre-ignition may be distinguished based on the output of the knock sensor in a single defined window. For example, pre-ignition may be indicated based on the output of the knock sensor being above a threshold in an earlier part of the window while knock is indicated based on the output of the knock sensor being higher than the threshold in a later part of the window. Furthermore, each window may have differing thresholds. For example, a first higher threshold may be applied in the first (earlier) pre-ignition window while a second, lower threshold is applied in the second (later) knock window.

Mitigating actions taken to address knock may differ from those taken by the controller to address pre-ignition. For example, knock may be addressed using spark retard and EGR while pre-ignition is addressed using cylinder enrichment, cylinder enleanment, engine load limiting, and/or delivery of cooled external EGR.

Figure 2:
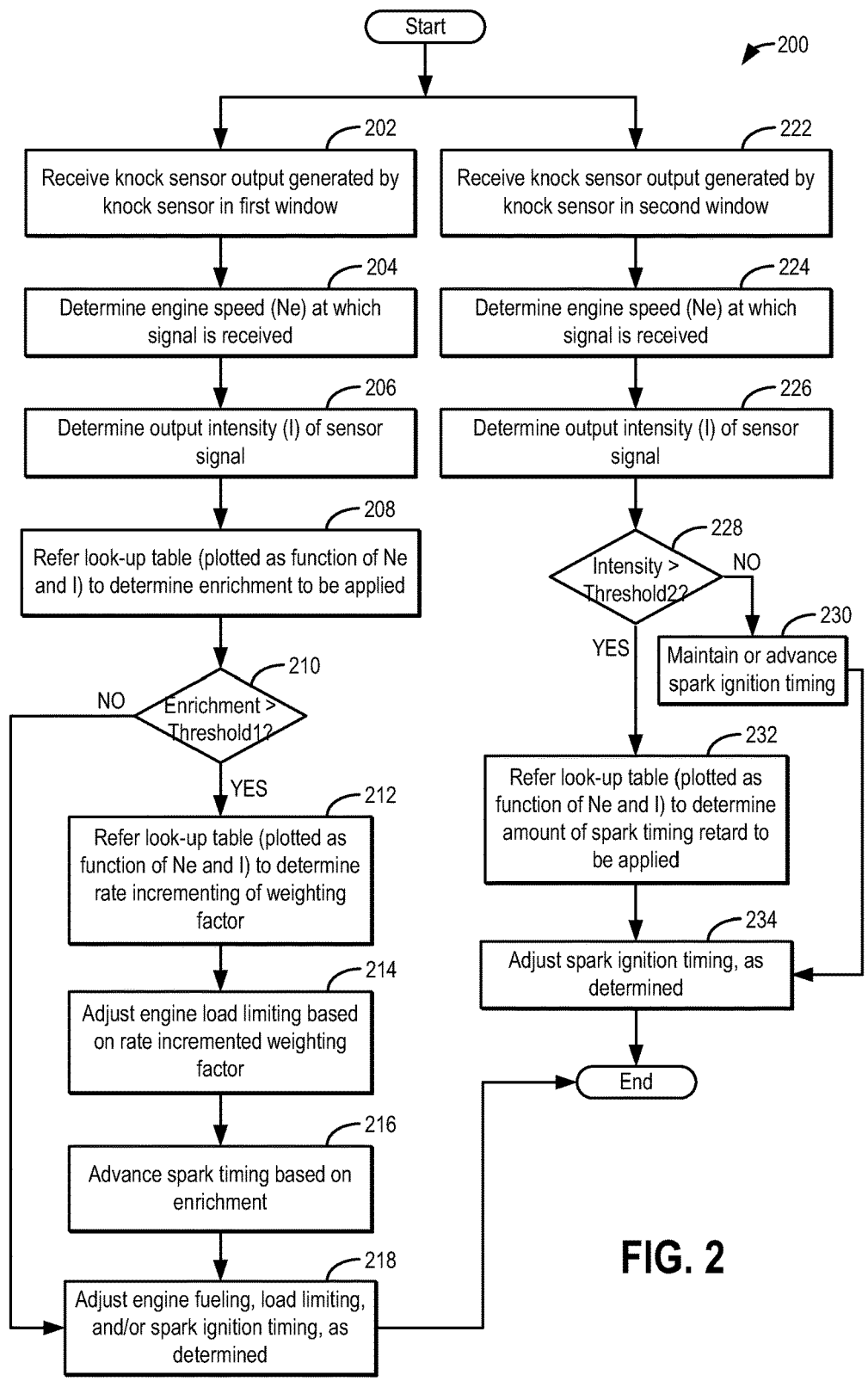
FIG. 2 shows a high level flow chart for performing abnormal combustion mitigating actions in the engine of FIG. 1 based on knock sensor signals generated in two partially overlapping windows.
Figure 3:
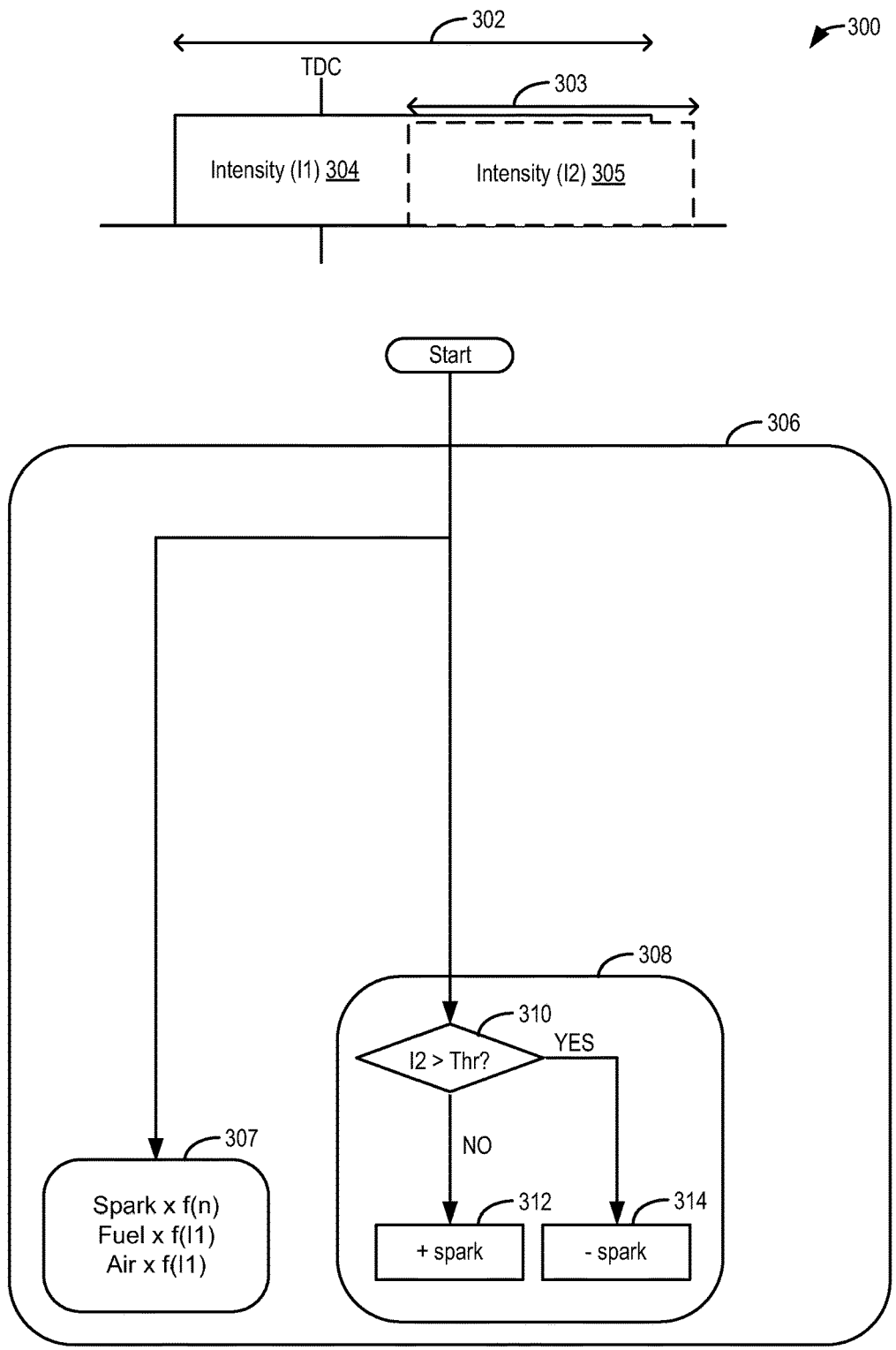
FIG. 3 shows a block diagram of the routine of FIG. 2.
Figure 4:
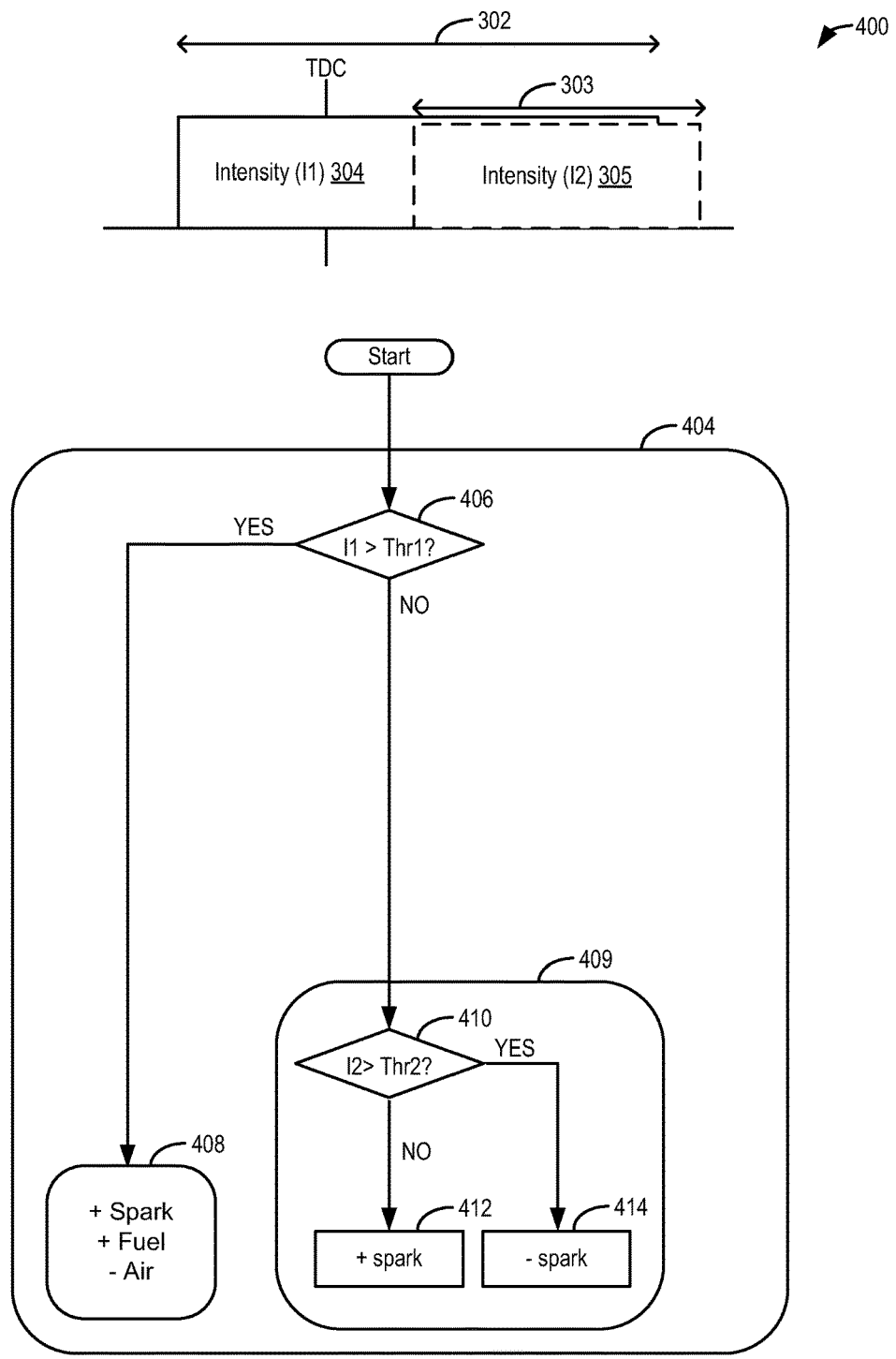
FIG. 4 shows an alternate embodiment of the routine of FIG. 3.

As elaborated with reference to FIGS. 2-4, the inventors have recognized that instead of detecting and differentiating abnormal combustion events, and then adjusting a mitigating action based on the nature of the abnormal combustion, mitigating actions may be performed based on an output intensity of the knock sensor in the one or more windows. Specifically, a nature of the mitigating action applied may be selected based on the knock sensor output intensity in the one or more windows, and furthermore, a severity of the mitigating action(s) applied may be increased as the knock sensor output intensity in the defined window increases. The mitigating action may also be adjusted based on the engine speed at which the knock sensor output is detected. For example, knock sensor output generated in the first window may be addressed via cylinder enrichment, while knock sensor output generated in the second window may be addressed via spark timing retard. As another example, the cylinder enrichment may be increased as the knock sensor output intensity in the first window increases, while the spark timing may be retarded further from MBT as the knock sensor output intensity in the second window exceeds a threshold.

Returning to FIG. 1, Controller 12 is shown as a microcomputer, including microprocessor unit 106, input/output ports 108, an electronic storage medium for executable programs and calibration values shown as read only memory chip 110 in this particular example, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; absolute manifold pressure signal (MAP) from sensor 124, cylinder AFR from EGO sensor 128, and abnormal combustion from knock sensor 90 and a crankshaft acceleration sensor. Engine speed signal, RPM, may be generated by controller 12 from signal PIP. Manifold pressure signal MAP from a manifold pressure sensor may be used to provide an indication of vacuum, or pressure, in the intake manifold.

Storage medium read-only memory 110 can be programmed with computer readable data representing instructions executable by processor 106 for performing the methods described below as well as other variants that are anticipated but not specifically listed. Example Now turning to FIG. 2, an example routine 200 is described for addressing abnormal cylinder combustion based on a knock sensor output intensity generated in two, partially overlapping windows. The routine adjusts the nature and severity of mitigating actions applied in response to abnormal combustion based on the knock sensor output intensity in the defined windows.

At 202, the routine includes, during each cylinder combustion event, receiving knock sensor output generated in a first window. In parallel, at 222, for the given combustion event, the routine includes receiving knock sensor output generated in a second window. As such, one or more signals may be generated by a knock sensor at different times within the first or second window. The knock sensor may be coupled to the cylinder undergoing the cylinder combustion event, or may be coupled to an engine block. In addition, the output of any signals generated by the knock sensor outside the defined windows may be disregarded.

The first and second windows may be crank angle timing windows and the first window may partially overlap the second window. For example, a start timing of the first window may be before a spark event for the given cylinder combustion event (e.g., at 15 degrees BTDC), and the end timing of the first window may be in the expansion stroke of the given cylinder combustion event (e.g., at 40 degrees ATC). In comparison, a start timing of the second window may be after the spark event and the end timing of the second window may be after the end of the first window. The windows may be adjusted so as to capture a variety of abnormal combustion events, such as those due to cylinder knock, cylinder misfire, as well as those due to cylinder pre-ignition. In one example, a size of the windows may be adjusted based on engine speed. Further, a size of the windows may be adjusted relative to one another. For example, the second window may have an absolute valve relative to TDC and the first window may be calibrated based on the second window, or the first window may have an absolute valve relative to TDC and the second window may be calibrated based on the first window. As an example, the first window may be calibrated to end 3.0 CA degrees before the second window ends at engine speeds from 0-1500 rpm, and calibrated to end 2.5 CA degrees before the second window ends at engine speeds from 1500-2500 rpm.

As will be elaborated below, the controller may be configured to perform a first set of abnormal combustion mitigating actions responsive to the knock sensor output generated in the first window (at 204-218) while performing a second, different set of abnormal combustion mitigating actions responsive to the knock sensor output generated in the second window (at 224-234). Thus, a severity and nature of mitigating action is selected and adjusted based on the knock sensor output intensity to address abnormal combustion due to one or more of knock and pre-ignition, without requiring differentiation between the abnormal combustion events.

At 204, after receiving knock sensor output(s) generated in the first window, the routine includes determining an engine speed at which each knock sensor output was received. For example, an output of a crankshaft acceleration sensor may be read. At 206, the routine includes determining an output intensity (I) of each sensor signal generated in the first window. For example, the sensor signal may be processed via various signal processing adjustments. As an example, the output of the knock sensor generated in the first window may be rectified, band pass filtered, integrated, etc., to determine an output intensity.

At 208, the routine includes determining an abnormal combustion mitigating enrichment to be applied based on the knock sensor output intensity and the engine speed at which the knock sensor output was detected. For example, the controller may refer a look-up table stored as a function of knock sensor output intensity relative to engine speed to determine an enrichment to be applied. Example look-up tables are shown with reference to FIG. 8. Determining the enrichment to be applied may include determining a degree richness of the enrichment, a number of enrichment cycles to be applied in the cylinder affected by the abnormal combustion, as well a number of engine cylinders to enrich. This may include enriching the cylinder affected by the abnormal cylinder combustion as well as additional cylinders not affected by abnormal cylinder combustion.

Cylinder enriching responsive the knock sensor output in the first window may be adjusted as a function of the output intensity of the knock sensor output in the first window. The adjusting of the enrichment includes increasing a degree of richness of the enrichment and/or a number of enriched cycles in the affected cylinder as the knock sensor output intensity in the first window increases (e.g., increases above a first threshold). The enriching may be further based on an engine speed at which the knock sensor output intensity occurs within the first window. For example, the degree of richness of the enrichment may be further increased when the engine speed at which the knock intensity is detected is within a first lower speed range (e.g., lower than a threshold). Herein, the elevated knock intensity at the lower engine speeds may be correlated with potential pre-ignition based combustion events and may be addressed with increased enrichment. Further still, the adjusting may include increasing a number of engine cylinders that are enriched in addition to the given cylinder (where knock sensor output was generated) as the knock sensor output intensity in the first window increases. That is, the number of engine cylinders to which the enrichment is extended is increased as the knocking intensity increases.

Referring to FIG. 8, map 802 shows a look-up table depicting the relationship between number of enrichment cycles and knocking intensity (KI) in the first window. As shown, the number of enrichment cycles is increased as the knock intensity increases. Map 804 shows a look-up table depicting the relationship between number of enrichment cycles and engine speed (Ne). As shown, the number of enriched cycles is increased as the engine speed increases. Map 808 shows a look-up table depicting the relationship between number of enrichment cycles as a function of knocking intensity (KI) and engine speed (Ne). As shown, the number of enriched cycles is increased as the knock intensity increases and the engine speed increases.

Returning to FIG. 2, at 210, the routine includes determining if the enrichment to be applied is higher than a threshold (Threshold1). For example, it may be determined if the number of enrichment cycles to be applied (e.g., based on the look-up tables of FIG. 8) is higher than a threshold number. If the enrichment is not higher than the threshold, the routine may move to 216 to adjust spark ignition timing in response to the knock sensor output intensity in the first window. Specifically, an amount of spark advance may be applied to the enriched cylinder based on the determined cylinder enrichment. For example, spark timing may be advanced for the enriched cylinder to recover the torque lost from cylinder operation at richer than rich for best torque (RBT). In addition, spark timing may be advanced to take advantage of the higher spark advance tolerance of the cylinder during enrichment due to cylinder charge cooling from the enrichment. In one example, spark timing may be advanced towards borderline spark (BDL) from MBT as the enrichment increases. In another example, spark timing may be advanced towards BDL as the enriching exceeds the threshold, as discussed below.

Next at 218, the routine adjusts the cylinder fueling so as to apply the determined enrichment and adjusts the spark timing to apply the determined spark advance.

If the enrichment is higher than the threshold at 210, then the controller may perform one or more additional mitigating actions. For example, engine load may be limited, an amount of engine load limiting to be applied based on the knock sensor output intensity and the engine speed at which the knock sensor output was detected in the first window. Specifically, at 212, the controller may refer a look-up table stored in the controller's memory as a function of knock sensor output intensity (in the first window) relative to engine speed to determine the engine load limiting required. An example look-up table is shown with reference to map 806 of FIG. 8 wherein engine load limiting is depicted as a function of knocking intensity (KI) and engine speed. Therein, the degree of engine load limiting is increased as the knock intensity increases and further as the engine speed increases in a defined engine speed-load range.

Alternatively, the controller may determine a weighting factor based on the number of enrichment cycles, or based on the knock sensor output intensity and the engine speed. The weighting factor may be further adjusted based on a pre-ignition count of the cylinder. The weighting factor may be used to adjust a rate incrementer, and may be indicative of a frequency of abnormal combustion (e.g., pre-ignition frequency) in the cylinder. The engine load limiting may then be adjusted based on the determined weighting factor at 214. Thus, as the frequency of abnormal combustion increases, the weighting factor may be increased, the rate incrementer output may be increased, and engine load may be further limited. It will be appreciated that while the example depicts adjusting engine load limiting based on the weighting factor, the enrichment may also be adjusted based on the weighting factor.

Referring to map 808 of FIG. 8, a look-up table depicting an output of the rate incrementer as a function of engine speed and knocking intensity (KI) is shown. Therein, the rate incrementer output is increased as the knock intensity increases and further as the engine speed increases in a defined engine speed-load range (until a threshold engine speed is reached). Engine load limiting may then be adjusted based on the rate incrementer. For example, as the rate incrementer output increases but is within a threshold output, cylinder enrichment may be increased. Then, when the rate incrementer output exceeds the threshold output, engine load limiting may be initiated in addition to the cylinder enrichment.

A detailed overview of engine load limiting applied in response to abnormal combustion is described with reference at FIGS. 5-7. Therein, based on various engine operating conditions, various engine load limiting tables are determined and a final value of engine load limiting is determined via interpolation between the various load limiting tables.

It will be appreciated that engine enrichment and load limiting is not adjusted responsive to the output intensity of the knock sensor outside the first window, even if the output is higher than a threshold outside the first window.

The routine may then move to 216 to advance spark ignition timing based on the determined cylinder enrichment to recover the torque lost from cylinder operation at richer than rich for best torque (RBT). In addition, spark timing may be advanced to take advantage of the higher spark advance tolerance of the cylinder during enrichment due to cylinder charge cooling from the enrichment. For example, spark timing may be advanced towards borderline spark (BDL) from MBT as the enrichment exceeds the threshold.

At 218, cylinder fueling is adjusted based on the determined enrichment. For example, an amount of fuel delivered via a direct and/or port injector into the determined cylinder(s) may be increased so as to operate the cylinder richer than stoichiometry, at the determined enrichment level. In addition, a number of injections via which the fuel is delivered may be increased. For example, the fuel may be delivered as multiple intake stroke injections or multiple compression stroke injections. Further still, a timing of the injection may be adjusted. For example, a portion of the fuel may be delivered in the intake stroke while a remaining portion of the fuel may be delivered in a compression stroke of the cylinder. Also at 218, engine intake airflow may be decreased to provide the desired level of engine load limiting. Furthermore, spark timing may be adjusted to provide the determined level of spark advance to the abnormal combustion affected cylinder.

It will be appreciated that while the depicted routine suggests addressing abnormal combustion detected in the first window with cylinder enrichment, engine load limiting, and spark advance, in still further examples, the abnormal combustion in the first window may be addressed with cylinder enleanment, and/or via increased recirculation of cooled exhaust residuals (that is, increased external EGR).

Returning to 222, after simultaneously determining the sensor output intensity in the second window, the routine proceeds to 224 to determine an engine speed at which each knock sensor output was received in the second window. For example, an output of a crankshaft acceleration sensor may be read. At 226, the routine includes determining an output intensity (I) of each sensor signal generated in the second window. For example, the sensor signal may be processed via various signal processing adjustments. As an example, the output of the knock sensor generated in the second window may be rectified, band pass filtered, integrated, etc., to determine an output intensity.

At 228, the knock sensor output intensity in the second window may be compared to a threshold (Threshold2) and it may be determined if the knocking intensity is higher than a threshold. The threshold may be based on a likelihood of cylinder knock, for example. In response to the knock sensor output generated in the second window for the given combustion event being higher than the threshold, at 232, the routine includes retarding spark ignition timing. For example, the controller may refer a look-up table stored as a function of knock sensor output intensity relative to engine speed to determine the amount of spark timing to be applied.

Adjusting spark timing based on the knocking intensity and the engine speed includes increasing an amount of spark retard from MBT as the engine speed at which the knock sensor output intensity generated in the second window was higher than the threshold increases. Herein, the elevated knock intensity at the higher engine speeds may be correlated with potential knock based combustion events and may be addressed with increased spark retard. If the knock sensor output intensity is not higher than the threshold, spark ignition timing may be maintained (or advanced) at 230. For example, spark timing may be maintained at MBT. It will be appreciated that spark ignition timing is not retarded responsive to the output intensity of the knock sensor outside the second window, even if the output is higher than the threshold outside the second window.

At 234, the routine proceeds to adjust spark ignition timing to provide the determined amount of spark retard.

The inventors herein have recognized the synergistic relationship between abnormal mitigation actions such as spark timing adjustments and fueling adjustments. For example, as cylinder enrichment is increased, the resulting cylinder charge cooling reduces the likelihood of further abnormal combustion events in the cylinder. This reduces the amount of spark timing retard required to mitigate the given abnormal combustion as well as to pre-empt further abnormal combustion events. In addition, the use of cylinder enrichment may also increase the cylinder's tolerance of spark timing advance. Therefore, in some embodiments, to reduce redundant use of spark timing retard in view of cylinder enrichment, the amount of spark retard applied in response to knock sensor output intensity generated in the second window may be adjusted based on the enrichment applied in response to the knock sensor output intensity generated in the first window. For example, if knock sensor output intensity is generated in each of the first and second window, and if the cylinder enrichment required to mitigate the abnormal combustion in the first window is higher than a threshold, the amount of spark retard applied to mitigate the abnormal combustion in the second window may be decreased. In one example, spark advance may be used.

In this way, each of a spark ignition timing adjustment, enrichment, and engine load limiting applied to an engine can be adjusted in proportion to an output intensity of a cylinder knock sensor in different crank angle windows during a combustion event in the cylinder.

FIG. 3 depicts the routine of FIG. 2 in an alternate format, as a block diagram. Specifically map 300 shows a first crank angle timing window 302 which starts from before a spark event (before TDC) in the cylinder and ends during an expansion stroke, and a second crank angle timing window 303 which starts from after the spark event (after TDC) in the cylinder and ends during the expansion stroke, after the first window has ended. A knock sensor output generated in first window 302 is processed to determine first output intensity (I1) 304 while knock sensor output generated in second window 303 is processed to determine second output intensity (I2) 305. As such, knock sensor output generated outside windows 302 and 303 are not used to determine abnormal combustion mitigating adjustments.

It will be appreciated that while the given example shows the first crank angle timing window starting before a spark event, this is not meant to be limiting. Specifically, even though pre-ignition is initiated before spark, the combustion may produce knocking pressure waves in the combustion chamber after spark discharge. Therefore, the start of the first crank angle timing window may, alternatively, be based on the expected location of the spark discharge. For example, it may be offset in either direction (e.g., positive or negative to the spark event), but more likely later than spark discharge.

Block 306 represents abnormal combustion mitigating adjustments that are performed based on the knock sensor output intensities 304, 305, generated in first and second windows 302, 303 respectively. Specifically, at 307, each of cylinder fueling, and engine airflow is adjusted as a function of the knock sensor output intensity (I1) 304 estimated in the first window 302 while spark timing is adjusted as a function of the number of enrichment cycles (n) determined. As elaborated with reference to FIG. 2, this includes increasing cylinder enrichment and engine load limiting as intensity 304 increases. In addition spark timing retard is decreased (or spark timing is advanced) as the number of enrichment cycles increases.

In parallel, at 308, selected spark timing adjustments are performed based on the knock sensor output intensity (I2) 305 generated in the second window. Specifically, at 310, the second output intensity 305 is compared to a threshold. If the intensity is not higher than the threshold, then at 312, spark timing is advanced or maintained. Else, if the intensity is higher than the threshold, at 314, spark timing is retarded.

In this way, for each cylinder combustion event, a controller may be configured to receive one or more signals generated by a knock sensor at different times within two partially overlapping windows, and adjust both cylinder spark timing and enrichment based on an output intensity of each of the one or more signals received within the windows. Specifically, cylinder enrichment is adjusted in proportion to the output intensity generated in the first window, while spark timing is retarded (from MBT) as a function of the output intensity generated in the second window. The enrichment is performed independent of an output intensity of signals generated by the knock sensor outside the first window, and the spark timing retard is adjusted independent of an output intensity of signals generated outside the second window. Herein, the windows may be partially overlapping crank angle window, the first window starting before the starting of the second window, and the first window ending before the ending of the second window. The adjusting may include retarding spark timing by an amount in response to the output intensity in the second window being higher than a threshold, the amount based on a difference between the output intensity and the threshold, and further based on an engine speed at which the signal exceeds the threshold. Likewise, the enriching of the affected cylinder may be in proportion to the output intensity in the first window, the enriching increased as the output intensity increases. The enriching may be further based on an engine speed at which the one or more signals is received. The enriching may include, for a given signal, as the output intensity increases, increasing a degree of richness of cylinder enrichment, increasing a number of enriched engine cycles, and/or increasing a number of engine cylinders that are enriched. Spark timing may also be adjusted based on the enriching, an amount of spark advance increased (or an amount of spark retard decreased) as the enriching exceeds an enrichment threshold. Further, the controller may limit an engine load as the enrichment exceeds the enrichment threshold.

Now turning to FIG. 4, an alternate abnormal combustion detection and mitigation routine is depicted as a block diagram. Map 400 of FIG. 4 shows the same windows as FIG. 3, specifically, first crank angle timing window 302 which starts from before a spark event (before TDC) in the cylinder and ends during an expansion stroke, and a second crank angle timing window 303 which starts from after the spark event (after TDC) in the cylinder and ends during the expansion stroke, after the first window has ended. As with FIG. 3, knock sensor output generated in first window 302 is processed to determine first output intensity (I1) 304 while knock sensor output generated in second window 303 is processed to determine second output intensity (I2) 305. As such, knock sensor output generated outside windows 302 and 303 are not used to determine abnormal combustion mitigating adjustments.

Block 404 represents abnormal combustion mitigating adjustments that are performed based on output intensities 304 and 305 relative to respective thresholds. Specifically, at 406, knock sensor output intensity 304 gathered in the first window 302 is compared to a first threshold Thr1. If the intensity is higher than first threshold Thr1, the routine moves to 408 where, as at 307, each of spark timing, cylinder fueling, and engine airflow is adjusted. As elaborated with reference to FIG. 3, this includes enriching the cylinder as knock intensity (I1) 304 exceeds the first threshold Thr1, and limiting an engine load while advancing spark timing as the enrichment increases. The spark timing may be advanced from borderline spark towards MBT as the enrichment increases. Herein, the enrichment, the engine load limiting, and the spark advance applied are adjusted, directly or indirectly, as a function of the first knock sensor output intensity 304 generated in the first window 302. In particular, the adjusting may be based on the difference between intensity 304 and Thr1. If intensity 304 is not higher than Thr1, then the abnormal combustion mitigating adjustments that are based on the first knock intensity 304 are not performed. Instead, the routine moves to 409 to perform abnormal combustion mitigating adjustments that are based on the second knock intensity 305. In particular, at 410, the second knock sensor output intensity 305 is compared to a second threshold Thr2 lower than first threshold Thr1. If the intensity is lower than Thr1 but higher than Thr2, the routine moves to 414 where spark timing is retarded. This includes increasing spark timing retard. No engine load limiting or cylinder enrichment is performed. Herein, the spark retard applied is adjusted as a function of intensity 403 and the engine speed at which intensity 403 exceeds Thr2. In addition, the spark timing is retarded based on the difference between intensity 403 and Thr3. If the intensity is lower than each of Thr1, and Thr2, at 412, the routine includes maintaining or advancing spark timing. Herein, the spark advance applied is adjusted as a function of intensity 403. For example, spark timing is advanced based on the difference between intensity 403 and Thr3. As such, at 406, a single threshold is used for both spark and fuel adjustments. A higher threshold may be used for spark adjustment, fuel adjustments, and load limiting.

Figure 5:
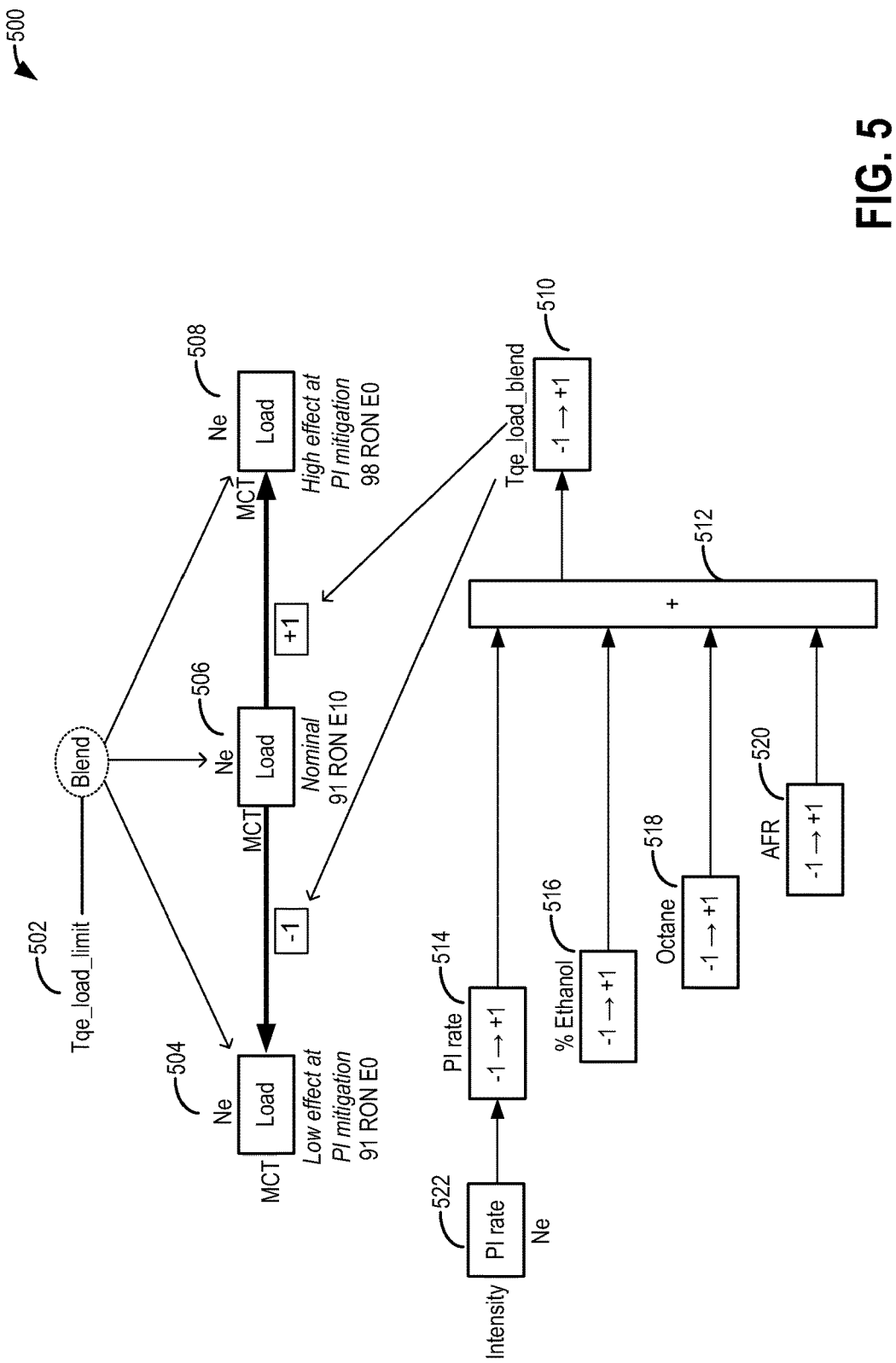
FIGS. 5-7 show block diagrams depicting adjusting of engine load-limiting and spark timing based on the output intensity of knock sensor signals generated in a first window.
Figure 6:
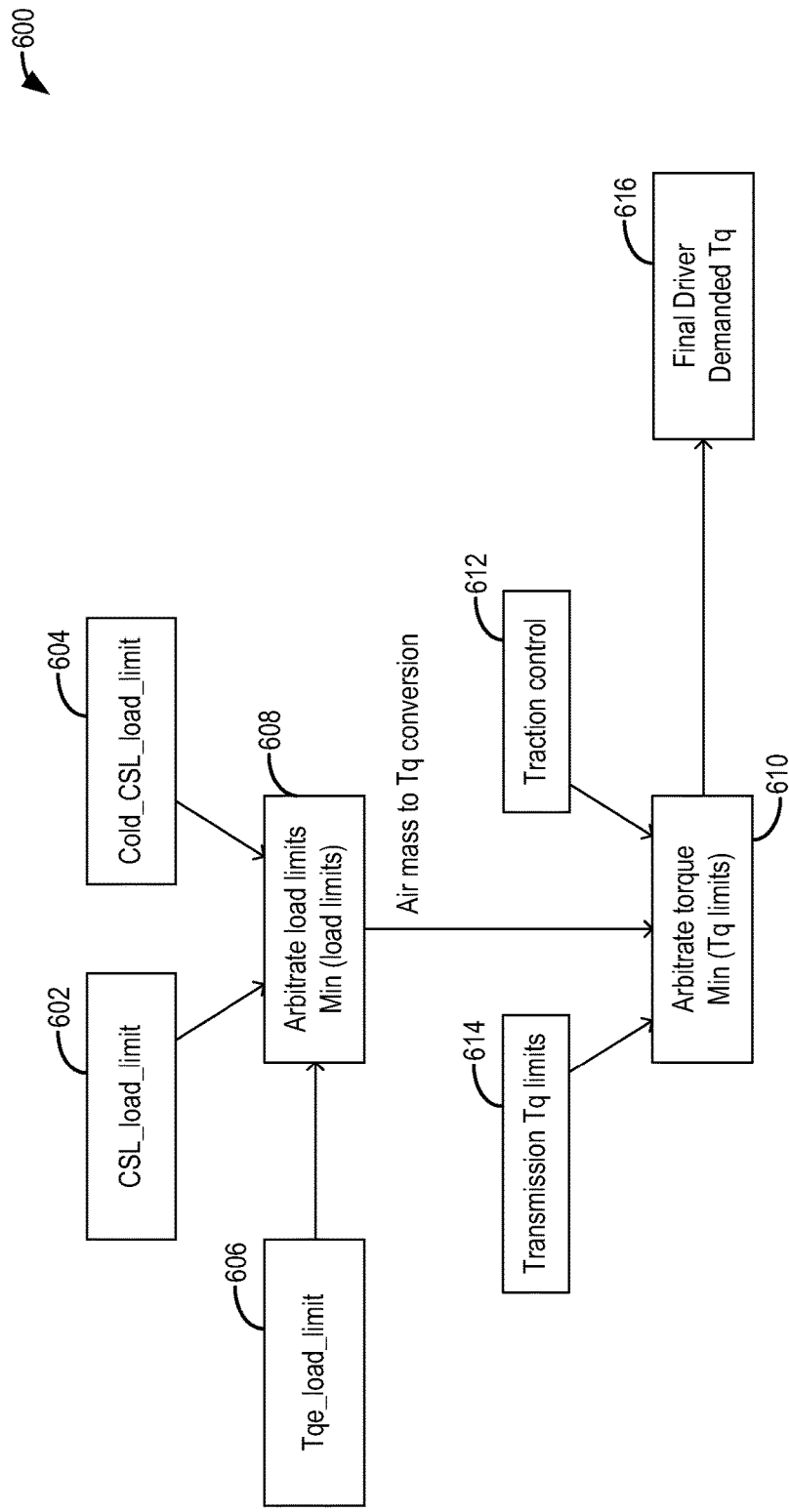
Figure 7:
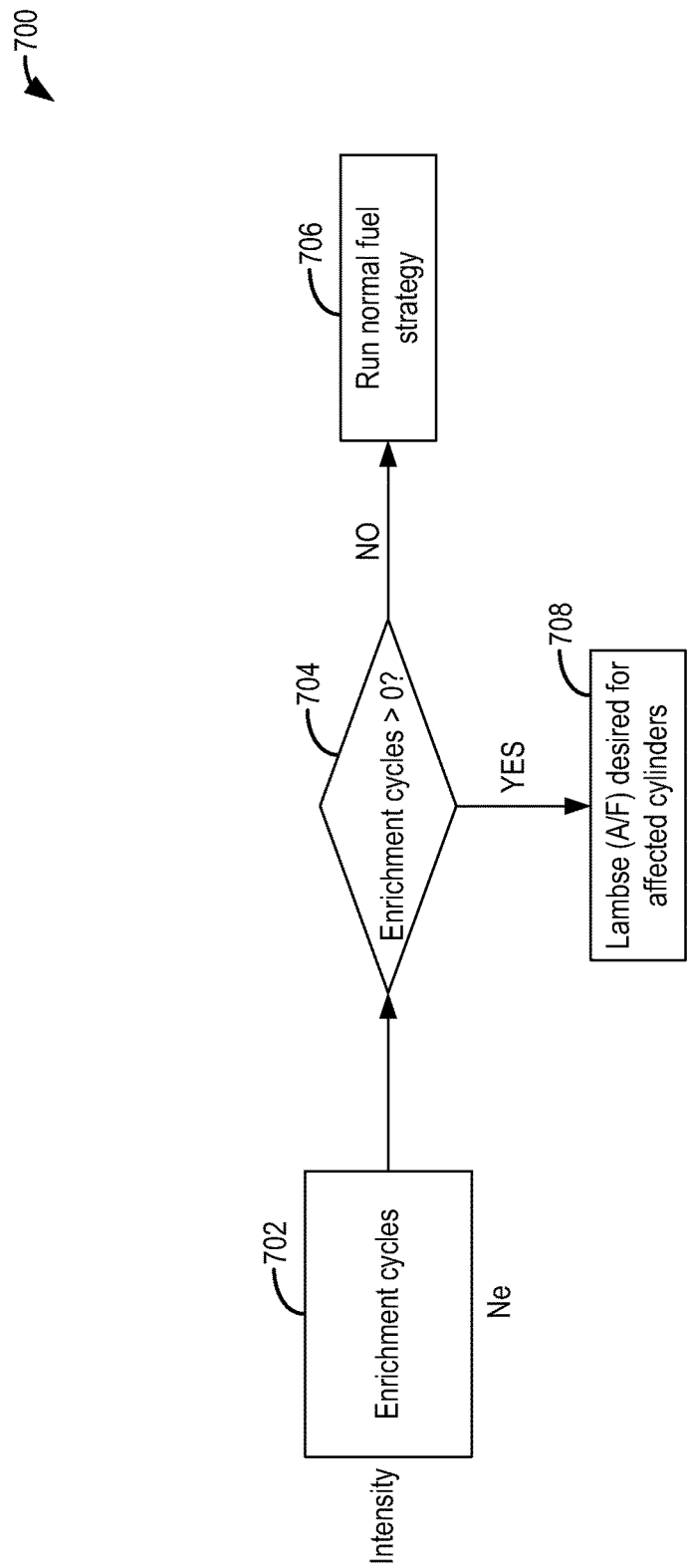

Now turning to FIGS. 5-7, schematic depictions of an engine load limiting routine is shown. The engine load limiting is performed responsive to a knock sensor output intensity in the first window. A cylinder enrichment is determined based on the knock sensor output intensity in the first window, and if the determined enrichment is more than a threshold (e.g., richer than a threshold AFR, or if a number of enrichment cycles is higher than a threshold number), load limiting is triggered. The load limiting is then adjusted as a function of the determined cylinder enrichment routine such as that load limit of the engine is increased as the determined enrichment increases. As such, this may be performed as a parallel evaluation based on the output of a look-up table (such as based on the output of look-up table 808 of FIG. 8. Therein, if the number of enrichment cycles is determined to be higher than a threshold (e.g., higher than 0), it triggers adjustments including enrichment and spark advance. The output of a rate incrementer (e.g., look-up table 810 of FIG. 8) is then used to determine load limiting. For example, if the output of the rate incrementer is higher than a threshold (e.g., higher than 0), it triggers adjustments including load limiting.

Turning to FIG. 5, the routine may start with a load limit 502 (Tqe_load_limit) determined in a feed-forward manner. Load limit 502 is determined based on engine operating conditions, such as based on an engine speed-load conditions. Load limit 502 may then be clipped based on various factors so as to minimize negative NVH issues associated with abnormal combustion, such as those associated with low speed pre-ignition events. In addition to controlling NVH, engine damaging knock events are also minimized.

The controller may use three sets of tables including a nominal table 506 based on nominal conditions, a high effectiveness table 508 (which has a higher effect on abnormal combustion mitigation and generates higher torque output), and a low effectiveness table 504 (which has a lower effect on abnormal combustion and generates a lower torque output). Each of tables 504, 506, and 508 is plotted as a function of manifold charge temperature (MCT) and engine speed (Ne), and the output of each table is a load clip. Load limit 502 is then clipped with a load clip, to blend the outputs of tables 504-508.

Specifically, a multiplication factor 510 (or Tqe_load_blend) is used to adjust the load clips output from tables 504-508 and interpolate between the low, nominal, and high effectiveness tables. Multiplication factor 510 ranges from −1 to 1. The factor may be based on various feed-forward measurements. For example, the factor may be based on fuel ethanol or alcohol content at 516, fuel octane content at 518, and air-to-fuel ratio (AFR) at 520. Thus, a lean air-to-fuel ratio or a low octane fuel that will make the probability of abnormal combustion go higher results in a load clip wherein the interpolation of the load clip moves the load limit to a lower value (such as towards the load clip of lower effectiveness table 504). In another example, a rich air-to-fuel ratio or a high octane content of the fuel may result in a higher load limit (such as towards the load clip of higher effectiveness table 508) since the enrichment reduces the probability of abnormal combustion. The load clip is also based on a rate of abnormal combustion, such as a rate of pre-ignition (herein also referred to as PI rate 514). PI rate 514 may be learned as a function of knock sensor output intensity and engine speed.

The load clip also includes the feedback portion of the load limiting, wherein the load limit is further adjusted based on PI rate 514. Therein, the PI rate may be incremented on a rate counter based on engine speed and knock sensor output intensity. The rate counter or weighting is incremented as the degree of enrichment or number of enriches cycles applied in response to the output of a knock sensor in a defined window (e.g., the first window of FIGS. 2-4) increases, and further based on an engine speed at which the knock sensor signal is detected. As the number of abnormal combustion events per vehicle miles driven increases, the rate may be further incremented. The rate may be decreased as the number of miles driven by the vehicle engine increases. As such, with enough miles, the rate can come back to zero and have no effect on load limiting if no abnormal combustion is observed. However, the operating conditions can affect the anticipation of abnormal combustion and hence the nominal load limit. The torque load limit is then arbitrated with the load clip by controller 512 to determine the arbitrated torque load limit 510.

In parallel, a rate incrementer may be counting the number of enrichment cycles performed in response to an abnormal combustion event. The number of enrichment cycles may be determined as a function of an output intensity of a knock sensor in the defined first window and an engine speed at which the knock sensor output is received. For example, as the knock sensor output intensity in the defined window increases, the number of enrichment cycles may be increased and the rate incrementer may be incremented by a defined amount. Alternatively, a weighting factor may be determined. If the rate incrementer output is high (e.g., higher than a threshold), or if the weighting factor is high (e.g., higher than a threshold), a weighted engine load limit may be calculated. This weighted engine load limit may have a more aggressive "learn down rate" and may be activated only when a threshold number of enrichment cycles have been used.

An example of such a rate incrementer is shown at map 700 of FIG. 7. Specifically, table 702 determines a number of enrichment cycles to be performed as a function of the output intensity of the knock sensor in the first window and an engine speed at which the knock sensor output is received. At 704 it is determined if the number of enrichment cycles is higher than a threshold (e.g., higher than 0 is the depicted example). If no, the engine may continue running with the normal fuel strategy at 706. For example, the engine cylinders may continue to be operated at stoichiometry. Else, if the number of enrichment cycles determined is higher, then air-fuel control for the abnormal combustion affected cylinders is adjusted at 708 so that the desired degree of richness can be provided.

Arbitration of torque load limits is shown at map 600 of FIG. 6. A controller may first determine torque load limits under different conditions. This includes a combustion stability limited load limit 602 (CSL_load_limit), a cold condition combustion stability limited load limit 604 (Cold_CSL_load_limit), as well as an interpolated torque load limit 606 (Tqe_load_limit). As such, the interpolated torque load limit 606 may correspond to the load clipped torque load limit determined at FIG. 5. At 608, a controller may arbitrate the load limits and select the desired load limit to be the lowest (that is, minimum) of load limits 602-606.

The arbitrated load limit then undergoes air mass to torque conversion. In addition, other weighted engine load limits are learned. These include, for example, transmission torque limits 614 and traction control limits 612. At 610, the controller may arbitrate the torque limits and select the final driver demanded torque 616 to be the lowest (that is, minimum) of load limits 612, 614, and the air mass to torque converted arbitrated load limit.

Thus, the final driver demanded torque may be the lowest of the interpolated torque limit and the weighted engine torque limit. Herein, the weighted engine torque limit may be more restrictive than the arbitrated torque load limit, but may vary relative to each other based on engine speed. For example, at low engine speeds, where pre-ignition is likely to occur, the weighted engine load limit may be the most restrictive. In comparison, at higher engine speeds, such as when knock is likely to occur, the clipped torque load limit may be the most restrictive. For example, the load clip may be more restrictive at lower engine speeds, and higher at medium to higher engine speeds. By selecting the lowest of the possible load limits, abnormal combustion is mitigated and further mega-knock events are pre-empted while addressing all other load affecting constraints.

Figure 9:
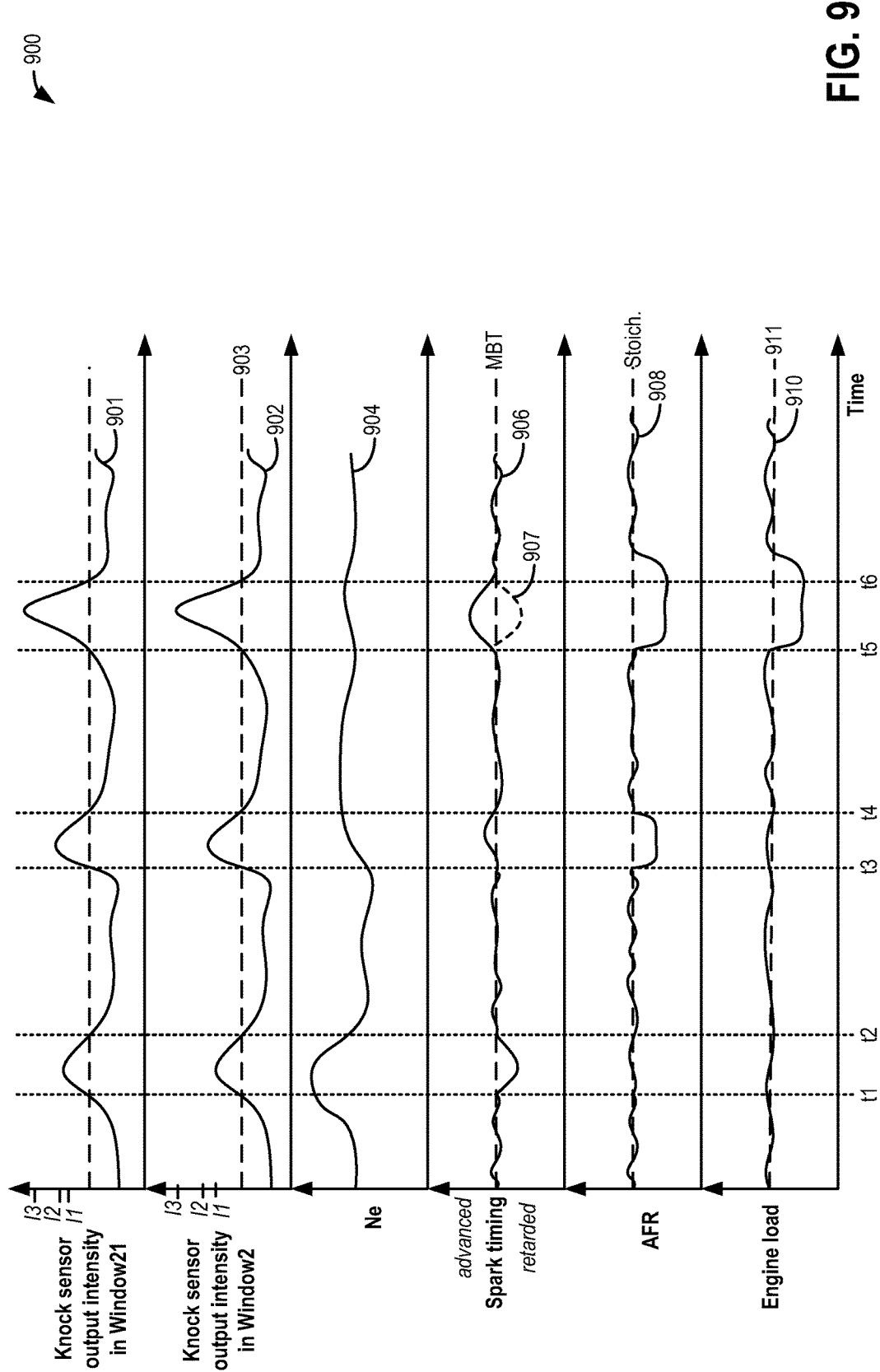
FIG. 9 shows example abnormal combustion mitigating operations, according to the present disclosure.

Now turning to FIG. 9, example abnormal combustion mitigating adjustments are described. Specifically, map 900 depicts knock sensor output intensity generated in a first earlier window at plot 901, and knock sensor output intensity generated in a second, later window at plot 902, wherein the first window and second window partially overlap. Engine speed (Ne) is shown at plot 904, spark timing at plot 906, air-fuel ratio (AFR) at plot 908, and engine load is depicted at plot 910.

Prior to t1, the engine may be operating at stoichiometry (plot 908) with spark timing at MBT (plot 906) and with engine airflow adjusted so as to maintain engine load around threshold 911. In addition, the knock sensor output intensity in each of the first and second windows may be lower than threshold 903. Accordingly, neither enrichment nor spark retard may be required to mitigate abnormal combustion.

At t1, the knock sensor output intensity generated in the second window (plot 902) may reach or exceed threshold 903. In particular, the peak signal may have an intensity I1. In response to the output exceeding threshold 903, spark timing may be retarded. The amount of spark retard applied may be determined as a function of the difference between peak intensity I1 and threshold 903. In addition, spark retard applied may be determined as a function of the engine speed. As such, the engine speed at which the knock sensor output intensity exceeds threshold 903 is higher at t1. Since the knock sensor output intensity generated in the first window (plot 901) is lower at t1, it may be determined that no enrichment cycles are required and combustion AFR may be maintained at or around stoichiometry. Spark timing retard may be applied for a duration from t1 to t2 until the knock sensor output intensity in the second window is below threshold 903. Thereafter, spark timing may be returned to MBT.

At t3, the knock sensor output intensity in the first window may increase and have an intensity I2 higher than peak intensity I1. In response to the elevated knock sensor output intensity in the first window, it may be determined that enrichment cycles are required. The enrichment required is determined as function of the peak knock sensor output intensity I2 in the first window. Thus, an amount of enrichment applied at t3 (including a degree of richness and a number of enriched engine cycles) is determined in proportion to peak intensity I2. In addition, based on the enrichment, as well as peak intensity I2, it may be determined that no engine load limiting is required and engine load is not reduced. A spark timing adjustment is also computed based on the enrichment applied. Specifically, based on the enrichment applied at t3, it may be determined that significant charge cooling benefits may be achieved and spark may be advanced (e.g., operated closer to MBT) to recover some of the torque lost due to cylinder operation at richer than RBT. In addition, since the knock sensor output intensity in the second window is below threshold 903, no spark timing retard is applied. The engine is then operated with a richer than stoichiometry AFR for a duration from t2 to t3 until the knock sensor output intensity in the first window has decreased. Thereafter, combustion AFR is returned to stoichiometry.

At t5, the knock sensor output intensity in the second window may once again reach or exceed threshold 903. Also at t5, the knock sensor output intensity in the first window may be elevated. In particular, the peak signal in the second window may have an intensity I2 while the peak signal in the first window may have an intensity I3, higher than intensity I2.

In response to the output in the second window exceeding threshold 903, an amount of spark timing retard 907 (dashed plot) may be determined as a function of the difference between peak intensity I2 and threshold 903, as further based on the engine speed. In addition, in response to the elevated output in the first window, an amount of cylinder enrichment (plot 908) is determined as a function of intensity I3, the amount of enrichment to be applied including a degree of richness and a number of enriched engine cycles. Herein, due to the higher peak intensity I3, a higher degree of richness and a larger number of enrichment cycles is determined. In addition, based on the enrichment, as well as peak intensity I3, it may be determined that engine load limiting is required and engine load is reduced relative to threshold 911.

In this way, FIG. 9 shows different engine operating parameter adjustments for different operating schemes in an engine. For example, following a first combustion event, as shown between times t1 and t2, the engine is operating with a first knock sensor output intensity in a first pre-ignition window not exceeding a first threshold (see Plot 901 at time t1) and the first knock sensor output intensity in a second knock window exceeding a second threshold (See plot 902 at time t1), the first window partially overlapping the second window. In response to this condition, at time t1, spark timing is retarded (see plot 906 at time t1). Then, following another combustion event, as shown between times t5 and t6, the engine is operating with a second knock sensor output intensity in a third pre-ignition window exceeding the first threshold (see plot 901 at time t5) and the second knock sensor output intensity in a fourth knock window exceeding the second threshold (see plot 902 at time t5), the third window partially overlapping the fourth window. In response to this condition, at time t5, the cylinder is enriched while spark timing is advanced (see plot 908 and plot 906 at time t5).

In this way, different degrees of abnormal combustion mitigation may be applied in proportion to the output intensity of a knock sensor generated in overlapping windows. By adjusting the intensity of the mitigating action based on the intensity of the knock sensor output, abnormal combustion due to various causes (e.g., knock, pre-ignition, misfire, etc.) can be addressed while reducing signal processing complexity. By adjusting spark timing retard based on the knock sensor output intensity generated in a later of two overlapping windows, abnormal combustion due to knock can be addressed. By adjusting cylinder enrichment as a function of knock sensor output intensity generated in an earlier of the two overlapping windows, abnormal combustion due to pre-ignition can be better addressed. By load limiting the engine as the applied enrichment increases, abnormal combustion induced further mega-knock events can be pre-empted, improving engine life and performance. By coordinating spark timing adjustments with enrichment adjustments, torque loss from the enrichment can be reduced, while also pre-empting further knock events. By addressing the abnormal combustion based on the intensity of the knock sensor output and the timing of the output, and without requiring differentiation of the abnormal combustion, knock and pre-ignition can be addressed with reduced reliance on complex signal processing.

Note that the example control and estimation routines included herein can be used with various engine and/or vehicle system configurations. The control methods and routines disclosed herein may be stored as executable instructions in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine, comprising:
    operating the engine with knock sensor output intensity occurring within a first window for a combustion event in a cylinder;
    in response to the knock sensor output intensity detected within the first window, enriching the cylinder in proportion to the knock sensor output intensity;
    operating the engine with knock sensor output intensity occurring within a second window for the combustion event in the cylinder being higher than a threshold; and
    in response to the knock sensor output intensity detected within the second window being higher than the threshold, retarding spark ignition in proportion to the enriching and a difference between the knock sensor output intensity and the threshold, the first window partially overlapping the second window, the first window indicating pre-ignition and the second window indicating knock.

2. The method of claim 1, further comprising receiving the knock sensor output intensity in each of the first window and the second window from a common knock sensor, wherein each of the first and second windows is a crank angle timing window, and wherein the first window partially overlapping the second window includes a start timing of the first window being earlier than a start timing of the second window, and an end timing of the first window being earlier than an end timing of the second window.

3. The method of claim 2, wherein the start timing of the first window is before a spark event of the cylinder and the end timing of the first window is in an expansion stroke, and wherein the start timing of the second window is after the spark event of the cylinder and the end timing of the second window is in the expansion stroke, after the end timing of the first window.

4. The method of claim 1, wherein an amount of spark retard applied is further based on an engine speed at which the knock sensor output intensity was higher than the threshold in the second window.

5. The method of claim 1, wherein the enriching is further adjusted based on an engine speed at which the knock sensor output intensity is detected within the first window, the enriching including increasing a degree of richness of the enrichment as the engine speed at which the knock sensor output intensity is detected in the first window falls below a threshold speed.

6. The method of claim 5, wherein the enriching further includes increasing a number of enriched engine cycles as the knock sensor output intensity detected in the first window increases.

7. The method of claim 5, wherein the cylinder is a first cylinder, and wherein the enriching further includes increasing a number of engine cylinders that are enriched in addition to the first cylinder as the knock sensor output intensity detected in the first window increases.

8. The method of claim 4, wherein an amount of spark retard from MBT is increased as the engine speed at which the knock sensor output intensity was higher than the threshold in the second window increases.

9. The method of claim 1, wherein retarding spark ignition in proportion to the enriching includes decreasing an amount of spark retard applied as the enriching exceeds a threshold degree of enrichment.

10. The method of claim 9, wherein decreasing the amount of spark retard applied includes, as the enriching applied in proportion to the knock sensor output intensity in the first window exceeds the threshold degree of enrichment, advancing spark from borderline spark towards MBT.

11. The method of claim 10, further comprising, in response to the knock sensor output intensity in the first window for the combustion event being higher than the threshold, limiting an engine load, the engine load limiting based on the enriching.

12. The method of claim 11, wherein the engine load limiting based on the enriching includes the engine load being limited further as a number of enrichment cycles in the cylinder increases.

13. The method of claim 10, wherein adjusting the enriching and the decreasing the amount of spark retard applied includes determining a weighting factor based on the knock sensor output intensity in the first window and engine speed at which the knock sensor output intensity was detected in the first window, and adjusting the enrichment and an amount of spark advance applied as a function of the determined weighting factor.

14. The method of claim 13, further comprising adjusting a degree of engine load limiting based on the determined weighting factor, wherein the weighting factor is further adjusted based on a pre-ignition count of the cylinder.

15. A method for an engine, comprising:
    operating the engine with a first knock sensor output intensity occurring within a first, earlier, pre-ignition window for a cylinder combustion event exceeding a first threshold;
    in response to the first knock sensor output intensity of occurring within the first, earlier, pre-ignition window for the cylinder combustion event exceeding the first threshold, enriching a cylinder as a function of the first knock sensor output intensity;

operating the engine with a second knock sensor output intensity occurring within a second, later, knock window for the cylinder combustion event exceeding a second threshold; and in response to the second knock sensor output intensity occurring within the second, later, knock window for the cylinder combustion event exceeding the second threshold, retarding spark timing as a function of each of the second output intensity and the enriching, wherein the first window partially overlaps the second window.

16. The method of claim 15, wherein the first threshold is higher than the second threshold.

17. The method of claim 16, wherein the enriching includes increasing a degree of enrichment as the first knock sensor output intensity exceeds the first threshold, and wherein the retarding spark timing includes:

in response to the second knock sensor output intensity in the second window exceeding the second threshold, determining an amount of spark timing retard to apply based on each of an engine speed at which the second knock sensor output intensity exceeded the second threshold and a difference between the second knock sensor output intensity and the second threshold; and decreasing the determined amount of spark timing retard as the degree of enrichment increases.

18. The method of claim 17, wherein the cylinder combustion event occurs in a first cylinder, and wherein increasing the degree of enrichment includes one or more of increasing a degree of richness of the enrichment, increasing a number of enrichment cycles of the enrichment, and increasing a number of engine cylinders in addition to the first cylinder to which the enrichment is extended.

19. The method of claim 18, further comprising adjusting an amount of load limiting applied to the engine in proportion to the degree of enrichment, the amount of load limiting increased as the degree of enrichment increases.

20. An engine method, comprising:

operating an engine with a first knock sensor output intensity in a first pre-ignition window not exceeding a first threshold and the first knock sensor output intensity in a second knock window exceeding a second threshold following a combustion event in a cylinder, the first window partially overlapping the second window;

receiving the first knock sensor output intensity from a knock sensor from each of the first and the second windows following the combustion event in the cylinder;

in response to the first knock sensor output intensity in the first window not exceeding the first threshold and the first knock sensor output intensity in the second window exceeding the second threshold, retarding spark timing;

operating the engine with a second knock sensor output intensity in a third pre-ignition window exceeding the first threshold and the second knock sensor output intensity in a fourth knock window exceeding the second threshold following another combustion event in the cylinder, the third window partially overlapping the fourth window; and in response to the second knock sensor output intensity in the third window exceeding the first threshold and the second knock sensor output intensity in the fourth window exceeding the second threshold, enriching the cylinder while advancing spark timing.

* * * * *